United States Patent
Anqud et al.

(10) Patent No.: US 7,496,030 B2
(45) Date of Patent: Feb. 24, 2009

(54) MANAGING LOOPS BETWEEN NETWORK DEVICES BY MONITORING MAC MOVES

(75) Inventors: Usama Anqud, San Ramon, CA (US); Javier Antich, Valencia (ES)

(73) Assignee: Lucent Technologies, Inc., Murray Hill, NJ (US)

( * ) Notice: Subject to any disclaimer, the term of this patent is extended or adjusted under 35 U.S.C. 154(b) by 1044 days.

(21) Appl. No.: 10/809,028

(22) Filed: Mar. 25, 2004

(65) Prior Publication Data

US 2004/0218539 A1 Nov. 4, 2004

Related U.S. Application Data

(60) Provisional application No. 60/457,678, filed on Mar. 26, 2003.

(51) Int. Cl.
*G01R 31/08* (2006.01)
*G06F 11/00* (2006.01)

(52) U.S. Cl. .............. 370/222; 370/216; 370/218; 370/219; 370/220

(58) Field of Classification Search ............ 370/216, 370/218, 222
See application file for complete search history.

(56) References Cited

U.S. PATENT DOCUMENTS

| | | | |
|---|---|---|---|
| 6,023,563 A * | 2/2000 | Shani ................... 709/249 |
| 6,104,696 A * | 8/2000 | Kadambi et al. ........... 370/218 |
| 6,198,729 B1 | 3/2001 | Hallenstal |
| 6,603,740 B1 | 8/2003 | Du |
| 6,857,027 B1 * | 2/2005 | Lindeborg et al. ......... 709/239 |

\* cited by examiner

*Primary Examiner*—Fan Tsang
*Assistant Examiner*—Phung-Hoang J Nguyen (57) ABSTRACT

A technique for managing loops between network devices such as customer and carrier edge devices involves monitoring the MAC moves that occur at a device to detect the existence of a loop and initiating a loop protection action if the MAC moves indicate that a loop exists. The number of MAC moves that indicates the existence of a loop is user programmable and pre-established in the device configuration. The number of MAC moves can be expressed as a MAC move threshold, which is defined in terms of, for example, a MAC move rate or a number of MAC moves. Typically, the loop protection action that is initiated in response to a detected loop involves blocking the flow of the looping packets at the corresponding device.

31 Claims, 8 Drawing Sheets

MANAGING LOOPS BETWEEN NETWORK DEVICES BY MONITORING MAC MOVES

CROSS-REFERENCE TO RELATED APPLICATION

This application is entitled to the benefit of provisional Patent Application Ser. No. 60/457,678, filed 26 Mar. 2003.

FIELD OF THE INVENTION

The invention relates generally to network management, and more particularly, to managing loops between network devices.

BACKGROUND OF THE INVENTION

Mission critical networks play an increasingly crucial role in the global business environment and are becoming inextricably linked to and dependent on carrier networks for support. In many cases, suppliers of carrier network services do not manage the customer premise equipment (CPE) of their customers' networks and therefore have no control over configuration errors at the customer network that can result in various network failures, including traffic loops. Such configuration errors at the customer network can force traffic into a never ending circular path that spans edge devices of the customer and carrier networks, significantly impacting the overall stability of the carrier network. Because the carrier does not control the CPE, the carrier is not able to resolve loops at the source. Resolving loops that originate from a customer network, typically requires manual troubleshooting by the carrier. Manual troubleshooting is expensive and time consuming.

In view of the relationship between carrier and customer networks, what is needed is a technique for managing loops between network devices, particularly edge devices of customer and carrier networks.

SUMMARY OF THE INVENTION

A technique for managing loops between network devices such as customer and carrier edge devices involves monitoring the MAC moves that occur at a device to detect the existence of a loop and initiating a loop protection action if the MAC moves indicate that a loop exists. The number of MAC moves that indicates the existence of a loop is user programmable and pre-established in the device configuration. The number of MAC moves can be expressed as a MAC move threshold, which is defined in terms of, for example, a MAC move rate or a number of MAC moves. Typically, the loop protection action that is initiated in response to a detected loop involves blocking the flow of the looping packets at the corresponding device. Managing loops by monitoring MAC moves safeguards carrier networks from loops that originate from customer networks, thereby increasing network reliability and reducing the operational costs of the carrier network.

Other aspects and advantages of the present invention will become apparent from the following detailed description, taken in conjunction with the accompanying drawings, illustrating by way of example the principles of the invention.

BREIF DESCRIPTION OF THE DRAWINGS

Throughout the description, similar reference numbers may be used to identify similar elements.

DETAILED DESCRIPTION

Figure 1:
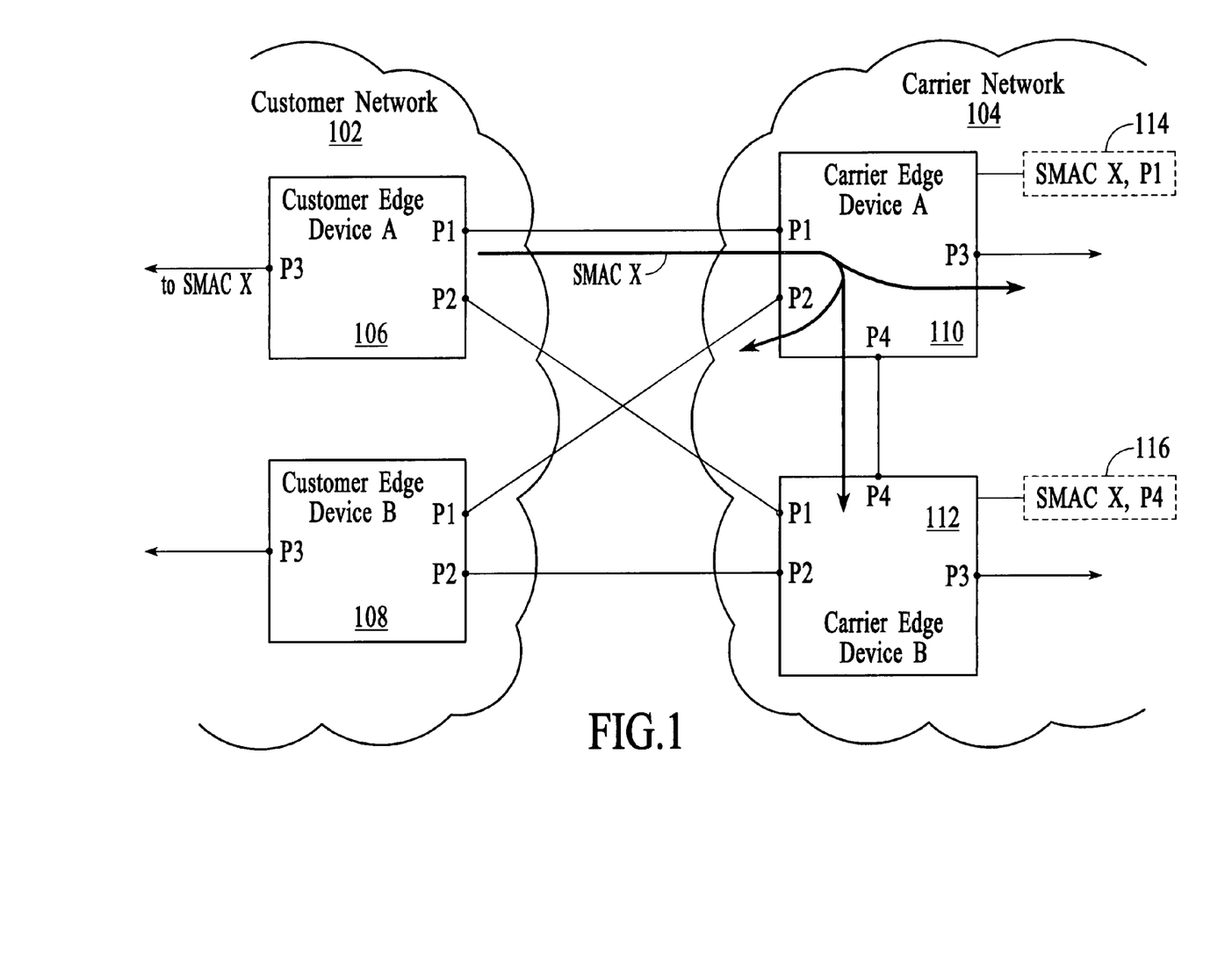
FIG. 1 depicts a first network, for example a customer network, which is connected to a second network, for example a carrier network.

FIG. 1 depicts a first network 100, for example a customer network, which is connected to a second network 104, for example a carrier network. The customer network includes two customer edge devices (customer edge devices A and B 106 and 108) and the carrier network includes two carrier edge devices (carrier edge devices A and B 110 and 112). In the example of FIG. 1, the customer and carrier edge devices utilize Ethernet at layer 2 of the open system interconnect (OSI) model as defined by the International Standards Organization (ISO). As is well known in the field, Ethernet assigned media access control (MAC) addresses to network devices and "source" and "destination" MAC addresses are used to determine how to forward packets through a network.

The customer edge devices 106 and 108 and the carrier edge devices 110 and 112 depicted in FIG. 1 are connected to each other in a redundant configuration in which each customer edge device is connected to each carrier edge device. Given the redundant configuration, each link between the customer network and the carrier network has a secondary link that can be utilized if the primary link fails. Although the redundant configuration provides improved reliability in the event of a link failure, the redundant configuration enables traffic loops that span between edge devices of the carrier and customer networks.

In addition to the redundant configuration, FIG. 1 also illustrates an example of MAC address learning that takes place at the carrier edge devices 110 and 112. In the example of FIG. 1, learning is based on a packet that is transmitted from customer edge device A 106 on port P1 with a source MAC address of X (referred to herein as "source MAC" or "source MAC X"). As is well known in the field of packet-based networking, particularly in Ethernet networks, when the packet arrives at carrier edge device A, the carrier edge device associates the source MAC of the packet with the port on which the packet arrived and stores the associated pair in a forwarding table. As illustrated by the dashed line box 114 in FIG. 1, the carrier edge device A associates source MAC X with port P1 through the learning process. The associated pair is then used to forward a subsequently received packet having a destination MAC that matches the MAC address of the associated MAC and port pair.

In addition to source MAC learning, if carrier edge device A 110 does not yet known how to reach the destination MAC address that is carried in the header of the packet (e.g., the next hop), then the carrier edge device will "flood" the packet out of all of its ports (except the port on which the packet was received) and wait to see on which port a complementary packet is received. Flooding is a well known technique in Ethernet-based networking and is not described in more detail herein. As a result of flooding, carrier edge device B 112 receives a copy of the packet with source MAC X at port P4. Through the learning process as described above, carrier edge device B associates source MAC X with its port P4 and stores the association in a forwarding table (see dashed line box 116).

Figure 2:
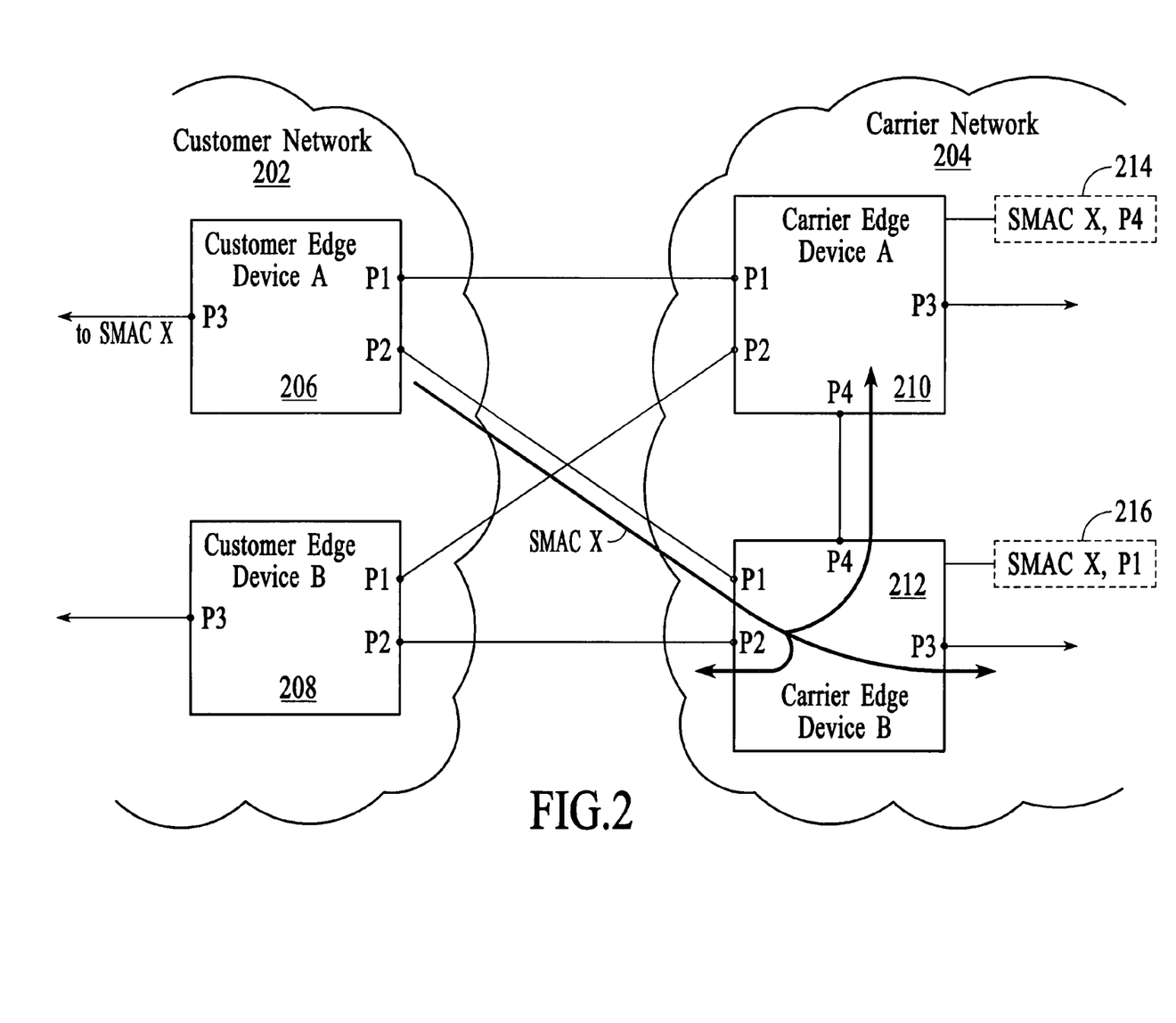
FIG. 2 illustrates the learning and flooding processes for the case of a customer packet that is transmitted from customer edge device A to carrier edge device B.

If the same packet were to emanate from port P2 of customer edge device A 106 instead of port P1 of customer edge device A, then the learning and flooding processes would be reversed for carrier edge devices A and B. FIG. 2 illustrates the learning and flooding processes for the case of a customer packet having source MAC X that is transmitted from customer edge device A 206 on port P2 to carrier edge device B 212. As illustrated in FIG. 2, carrier edge device B receives the packet and learns source MAC X on port P1 (see dashed line box 216). Assuming carrier edge device B does not already know the next hop for the destination MAC address of the received packet, carrier edge device B floods the packet to carrier edge device A 210 via port P4. In response to the flooding at carrier edge device B, carrier edge device A learns source MAC X on its port P4 (see dashed line box 214).

Given the scenarios of FIGS. 1 and 2, if customer edge device A forwards a packet to the carrier network from either port P1 or P2, then the carrier edge devices perform the necessary learning and the carrier network settles into a steady state (e.g., the forwarding tables stabilize and learning is limited to new flows). However, if the customer network experiences a configuration error that allows the same packet (or different packets with the same source MAC) to be forwarded from both port P1 and port P2 of customer edge device A, a loop or loops may be created between customer edge device A and carrier edge devices A and B.

Figure 3:
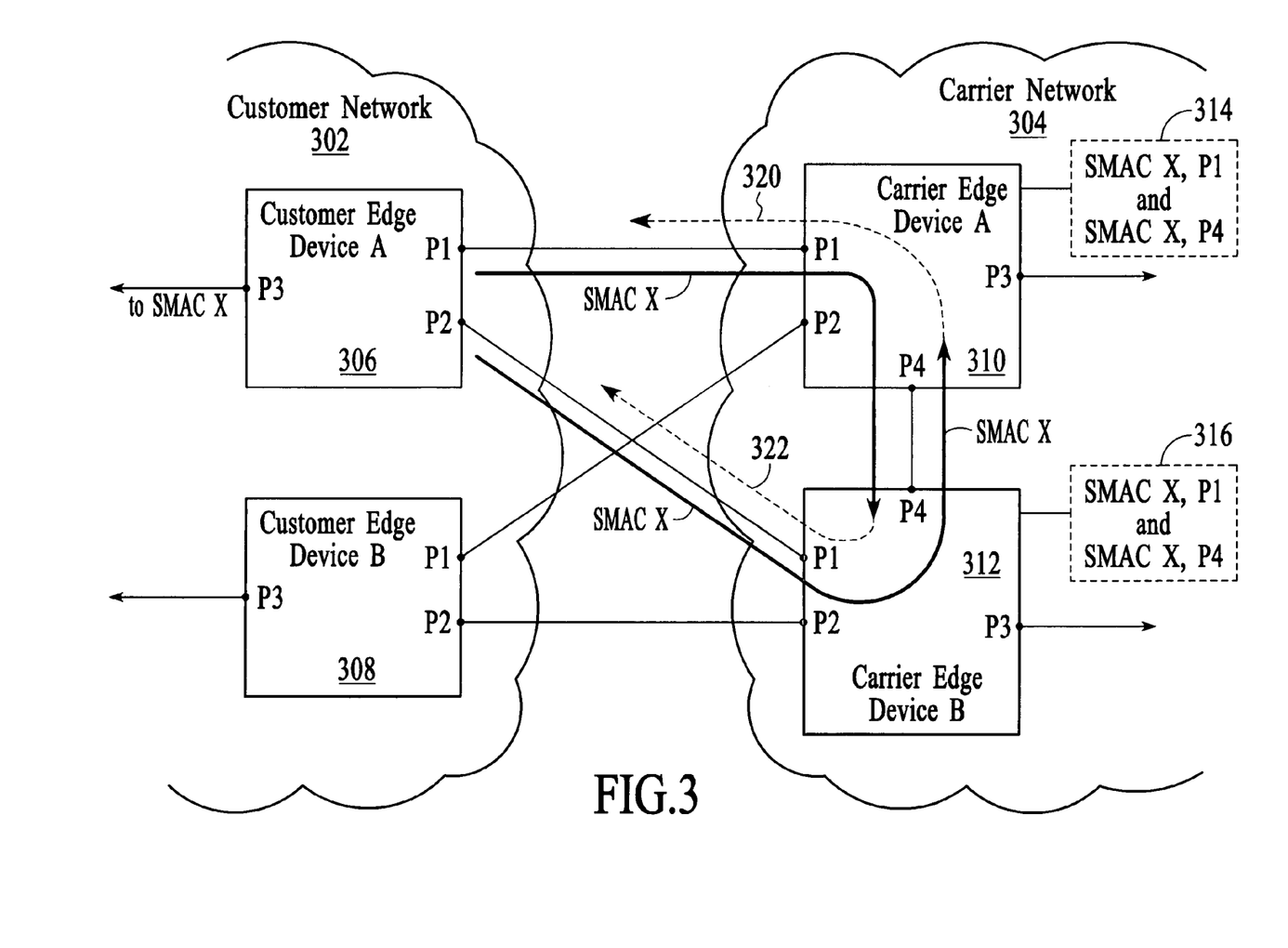
FIG. 3 illustrates the loops that are created between the customer network and the carrier network when packets having the same source MAC addresses are forwarded to the carrier network from two ports of customer edge device A.

FIG. 3 illustrates the loops that are created between the customer network 302 and the carrier network 304 when packets having the same source MAC are forwarded to the carrier network from two ports of customer edge device A 306. Referring to FIG. 3, customer edge device A forwards packets with source MAC X from both ports P1 and P2. Carrier edge device A 310 receives one of the packets with source MAC X at port P1 and learns source MAC X on port P1 as described above. Carrier edge device A also floods the received packet to carrier edge device B 312. Carrier edge device B receives one of the packets with source MAC X at its port P1 and learns source MAC X on P1. Carrier edge device B also floods the received packet to carrier edge device A. Carrier edge device A receives, at port P4, the flooded packet from carrier edge device B and responds by flooding the packet to port P1 (as indicated by dashed line 320). Likewise, carrier edge device B receives, at port 4, the flooded packet from carrier edge device A and responds by flooding the packet to port P1 (as indicated by dashed line 322). Thus, the flooding creates one loop that runs (clockwise) from customer edge device A, to carrier edge device A, to carrier edge device B, and back to customer edge device A and another loop that runs (counter clockwise) from customer edge device A, to carrier edge device B, to carrier edge device A, and back to customer edge device A. The looping traffic can have a severe negative impact on the performance of the carrier network.

As a result of the loops that are created between the customer and carrier edge devices, carrier edge devices A and B 310 and 312 learn source MAC X on two different ports. For example, when carrier edge device A receives a packet on port P1, it learns source MAC X on port P1 and when it receives a packet on port P4, it learns source MAC X on port P4 (see dashed line boxes 314 and 316). This causes the carrier edge device to go into an unsettled state in which the source MAC and port association is constantly changing. Each change in the source MAC and port association is referred to herein as a "MAC move" because the source MAC address moves from appearing at one port to appearing at another port. In sum, when a loop exists, the affected carrier edge device experiences a significant increase in the rate of MAC moves that occur.

In accordance with an embodiment of the invention, loops between network devices such as customer and carrier edge devices are managed by monitoring the MAC moves that occur at a device to detect the existence of a loop and then initiating a loop protection action if the MAC moves indicate that a loop exists. The number of MAC moves that indicates the existence of a loop is user programmable and pre-established in the device configuration. The number of MAC moves can be expressed as a MAC move threshold, which is defined in terms of, for example, a MAC move rate or a number of MAC moves. Typically, the loop protection action that is initiated in response to a detected loop involves blocking the flow of the looping packets at the corresponding device.

Figure 4:
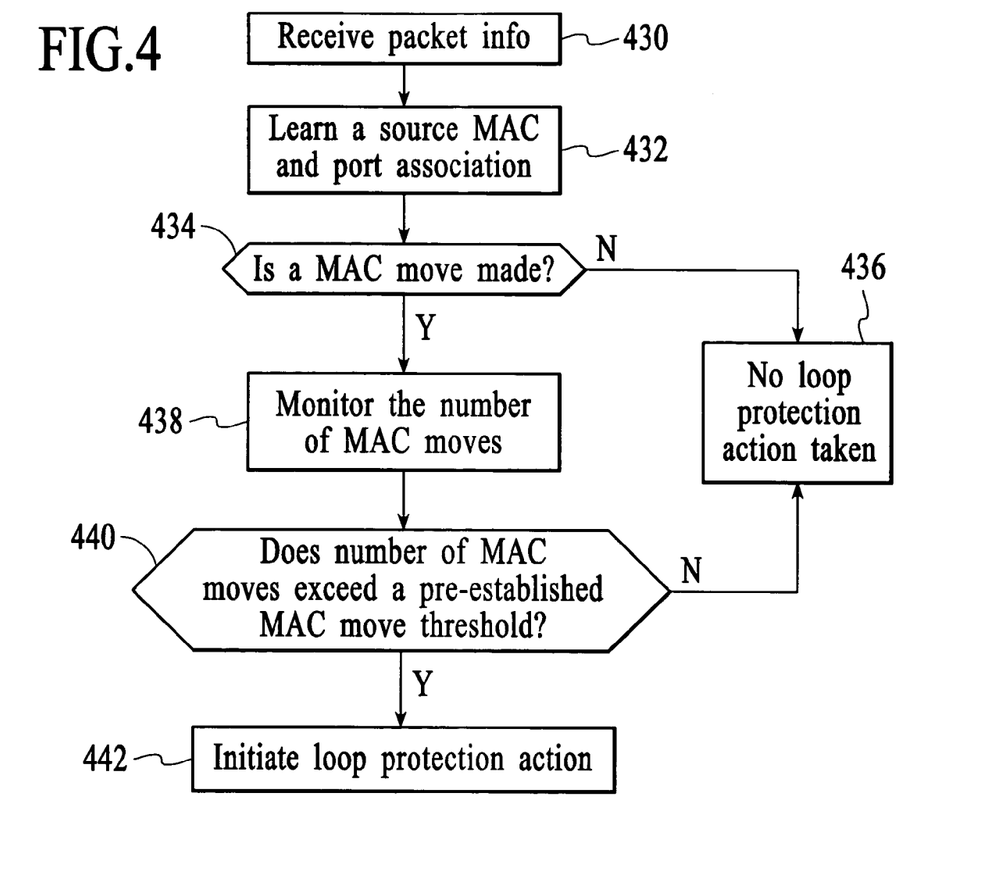
FIG. 4 is a process flow diagram of a method for managing loops between network devices in accordance with an embodiment of the invention.

FIG. 4 is a process flow diagram of a method for managing loops between network devices in accordance with an embodiment of the invention. At block 430, packet information is received. At block 432, a source MAC and port association is learned. At decision point 434, it is determined whether the learned source MAC and port association triggers a MAC move. If the learned source MAC and port association does not trigger a MAC move, then no loop protection action is taken, block 436. However, if the learned source MAC and association does trigger a MAC move, then the number of MAC moves is monitored, block 438. At decision block 440, it is determined if the number of MAC moves exceeds a pre-established MAC move threshold. If the pre-established MAC move threshold is not exceeded, then no loop protection action is taken, block 436. However, if the pre-established MAC move threshold is exceeded, then a loop protection action is initiated, block 442.

Figure 5:
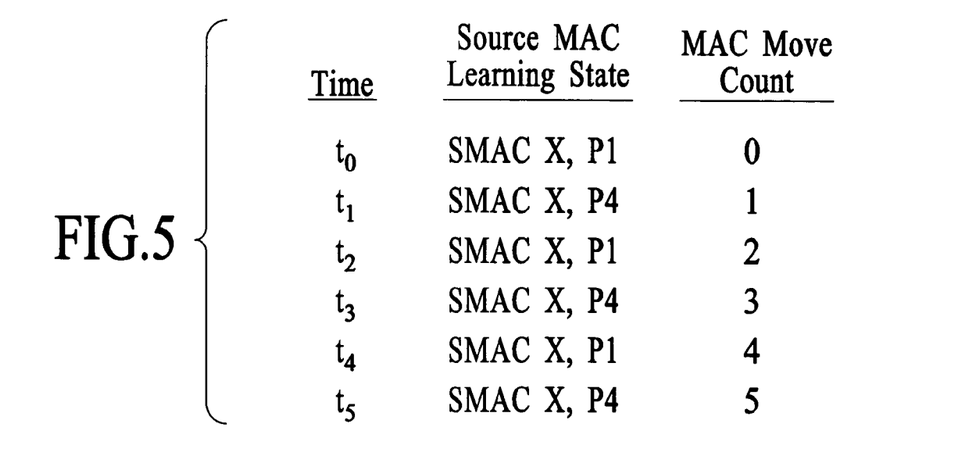
FIG. 5 illustrates an example implementation of the method that is depicted in FIG. 4 relative to carrier edge device A in FIG. 3.

FIG. 5 illustrates an example implementation of the method that is depicted in FIG. 4 relative to carrier edge device A in FIG. 3. The example implementation shows a table of the MAC learning state of the carrier edge device and the cumulative number of MAC moves as a function of time. The table includes five MAC moves that occur from time $t_0$ to time $t_5$. MAC moves and the MAC move threshold can be defined and/or expressed in terms of the number of MAC moves or a MAC move rate depending on the implementation. In general, the MAC move rate is calculated as:

$$MAC \text{ move rate} = \text{number of } MAC \text{ moves/elapsed time}$$

In the example of FIG. 5, the MAC move rate is calculated as $5/(t_5-t_0)$. In an embodiment, the MAC move rate is programmed as a number of MAC moves per second and the MAC moves are monitored with a counter that is incremented for each MAC move.

Figure 6:
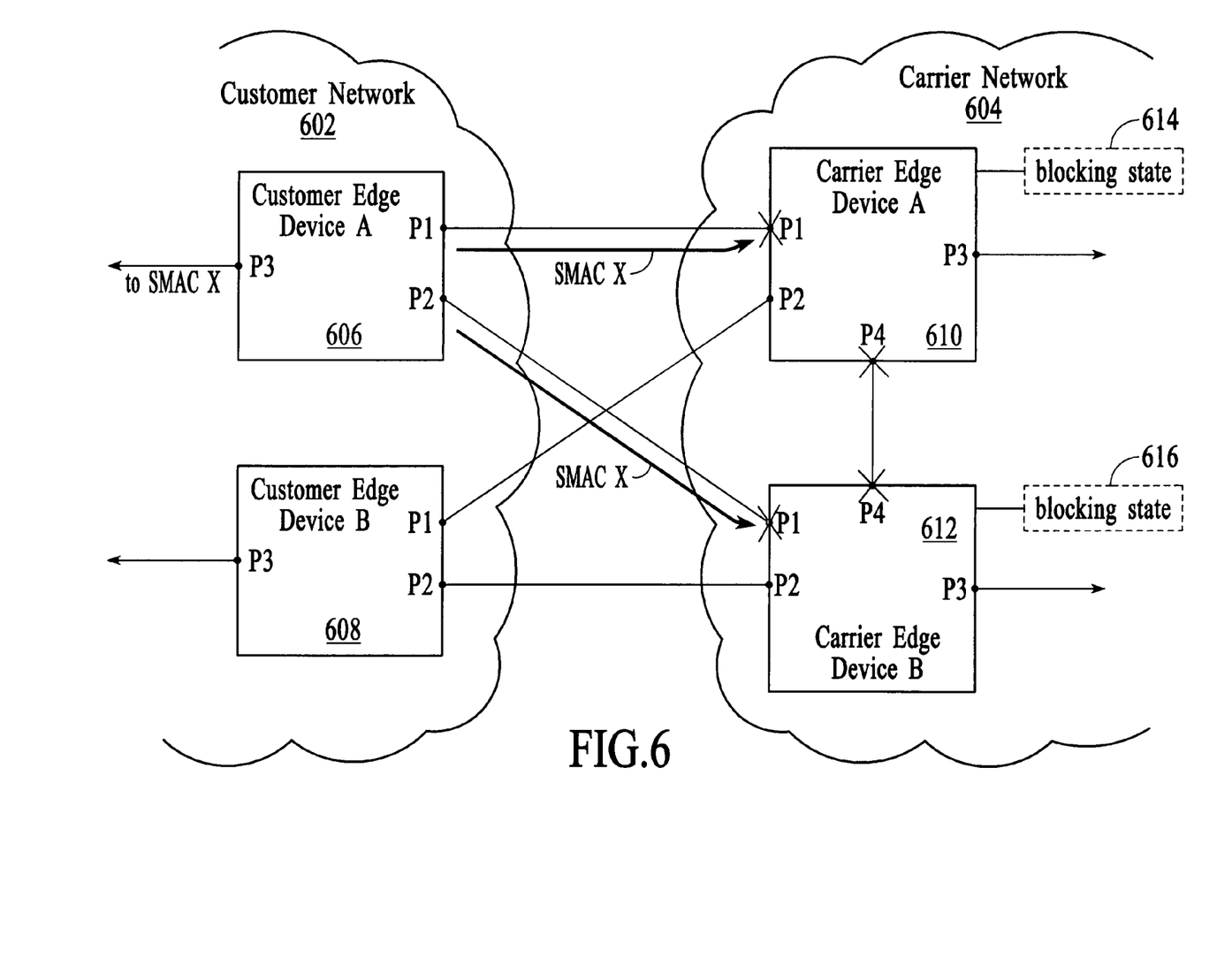
FIG. 6 illustrates ports in a blocking state and how blocking the source MAC flows at the carrier edge devices eliminates the existence of loops.

For example purposes, it is assumed that the MAC move rate in the example of FIG. 5 exceeds the pre-established MAC move threshold. As described above with reference to FIG. 4, once the MAC move rate is determined to exceed the pre-established MAC move threshold, a loop protection action is initiated. In an embodiment, a loop protection action involves blocking all of the packet flows related to the source MAC that exceeds the MAC move threshold. In the example of FIG. 3, if the MAC move rate is exceeded at both carrier edge devices A and B 310 and 312, then the corresponding flows with source MAC X are blocked at the ports of both carrier edge devices. FIG. 6 illustrates the relevant ports in a blocking state (all of the ports could be put into a blocking state for the flow) and how blocking the source MAC flows at the relevant ports of the carrier edge devices eliminates the existence of loops.

In an embodiment, the blocking is configured to last for a pre-established time period after which the blocking is automatically released. Ideally, the configuration error at the customer edge device is corrected during the time that the blocking is in place. If the configuration error still exists when the ports are released, then the loops may start again, eventually causing the blocking to be initiated again. In another embodiment, the blocking is configured to last until it is manually released. Other techniques for releasing the blocking can be implemented.

In an embodiment, the blocking is specific to the flow that exceeds the MAC move threshold. That is, packets from flows that do not exceed the MAC move threshold are not blocked when the loop protection is initiated. For example, if source MAC X utilizes two different VLANs (e.g., VLAN 10 and VLAN 20) and only VLAN 10 packets are looping and causing the MAC move threshold to be exceeded, then only the packets with source MAC X and VLAN 10 will be blocked. This "flow-specific" blocking can be applied to any flow designation, category, class etc. Flows can be designated by any combination of, for example, source MAC, destination MAC, VLAN ID, MPLS label, tag etc. In contrast, other loop management systems such as the spanning tree protocol (STP), as defined by the IEEE 802.1D, block all traffic at a port when a port goes into a blocking state.

Figure 7:
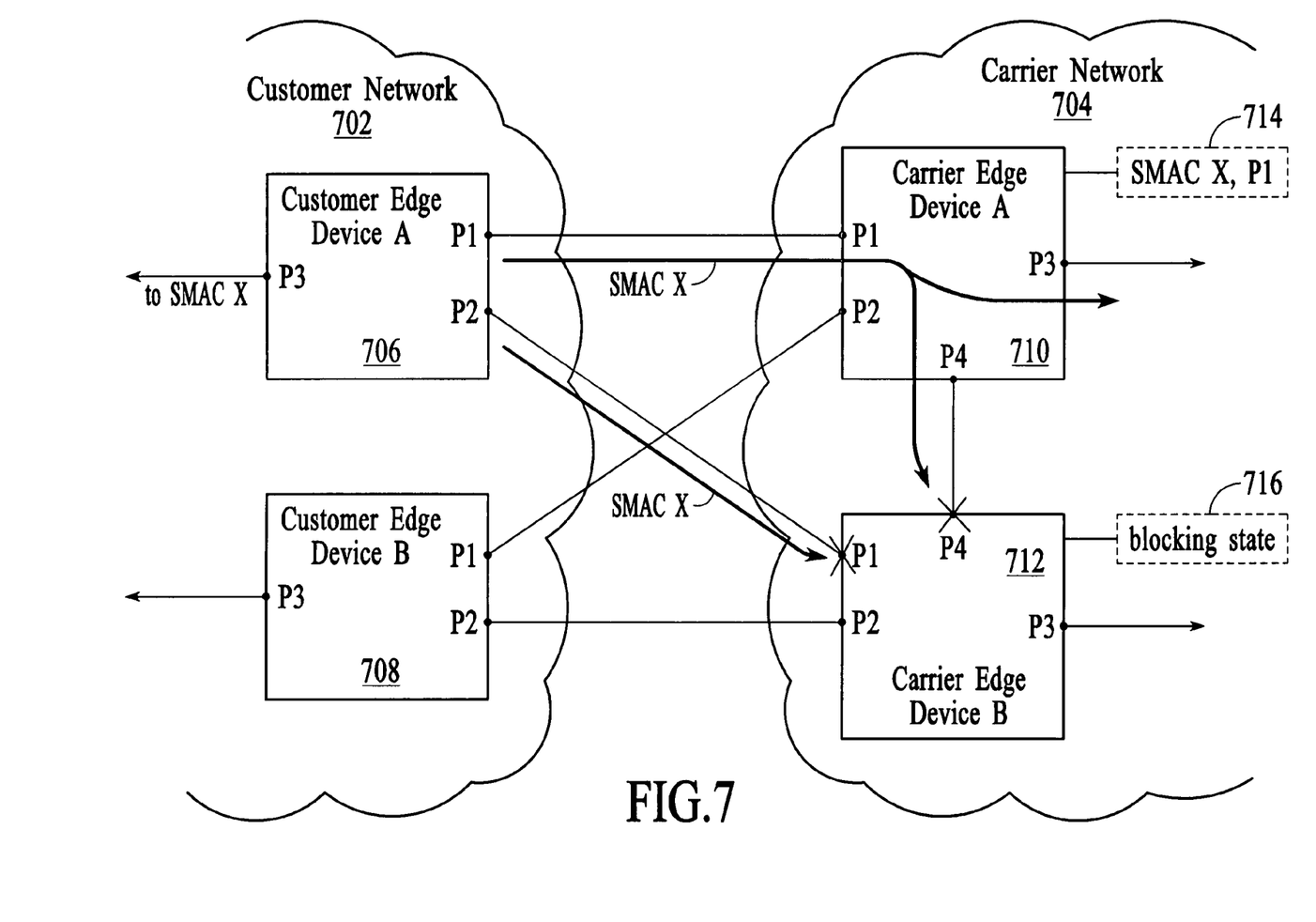
FIG. 7 illustrates the case in which carrier edge device B initiates blocking before carrier edge device A.

Although blocking the corresponding flows eliminates the loop problem, blocking the corresponding flows at both carrier edge devices as depicted in FIG. 6 prevents (at least temporarily) the blocked traffic from reaching its destination. In another embodiment, one of the carrier edge devices will exceed the MAC move threshold and initiate blocking before the MAC move threshold is exceeded at the other carrier edge device. FIG. 7 illustrates the case in which carrier edge device B 712 initiates blocking before carrier edge device A 710. In particular, carrier edge device B blocks the corresponding flows at ports P1 and P4 as indicated in FIG. 7. In this case, the loop condition is eliminated as a result of the blocking at carrier edge device B and packets with source MAC X are still able to pass into the carrier network from customer edge device A 706 through carrier edge device A. Additionally, because the loop condition is eliminated, carrier edge device A will probably not exceed the MAC move threshold and therefore will not initiate its own blocking.

In an embodiment, the flows that are allowed to be blocked in response to loop detection are configurable. That is, each carrier edge device can be configured to allow the blocking of only certain flows. The designation of blockable flows may include any combination of, for example, ports, virtual circuits, VLANs, MPLS labels, tagged packets, untagged packets etc. In an embodiment, the designation of blockable flows includes a list of blockable ports and a list of VLANs that can be blocked on the blockable ports. The VLANs may be identified as, for example, a specific VLAN (e.g., VLAN 10), VLAN ranges (e.g., 10-20, 40-50, and 60), all VLANs, or all VLANs except designated VLANs.

The loop management system can also be configured to log a message that indicates the blocking action. The message can be sent to a syslog server. Messages indicating unblocking can also be generated and sent to the syslog server.

The MAC move threshold can be established in many different ways. According to one technique, a loop or loops are purposefully created between the customer and carrier edge devices and the number of MAC moves is monitored. For example, the MAC move rate is measured by counting the number of MAC moves per unit of time. The MAC move threshold is then established in view of the measured MAC move rate.

As used herein, the term "MAC move" may include changes to features other than the port depending on which protocol or protocols are running. In this way, what constitutes a MAC move is feature (i.e., protocol) specific. Examples of changes that can constitute a MAC move include:

1) a source MAC moving from one port to another port as described above with reference to FIG. 3.
2) a source MAC moving from one VLAN to another VLAN (e.g., from VLAN 10 to VLAN 20).
3) a source MAC moving from one asynchronous transfer mode (ATM) VC to another ATM VC (even if a related VLAN ID stays the same).
4) a source MAC moving from one multiprotocol label switched (MPLS) label to another MPLS label.

Figure 8:
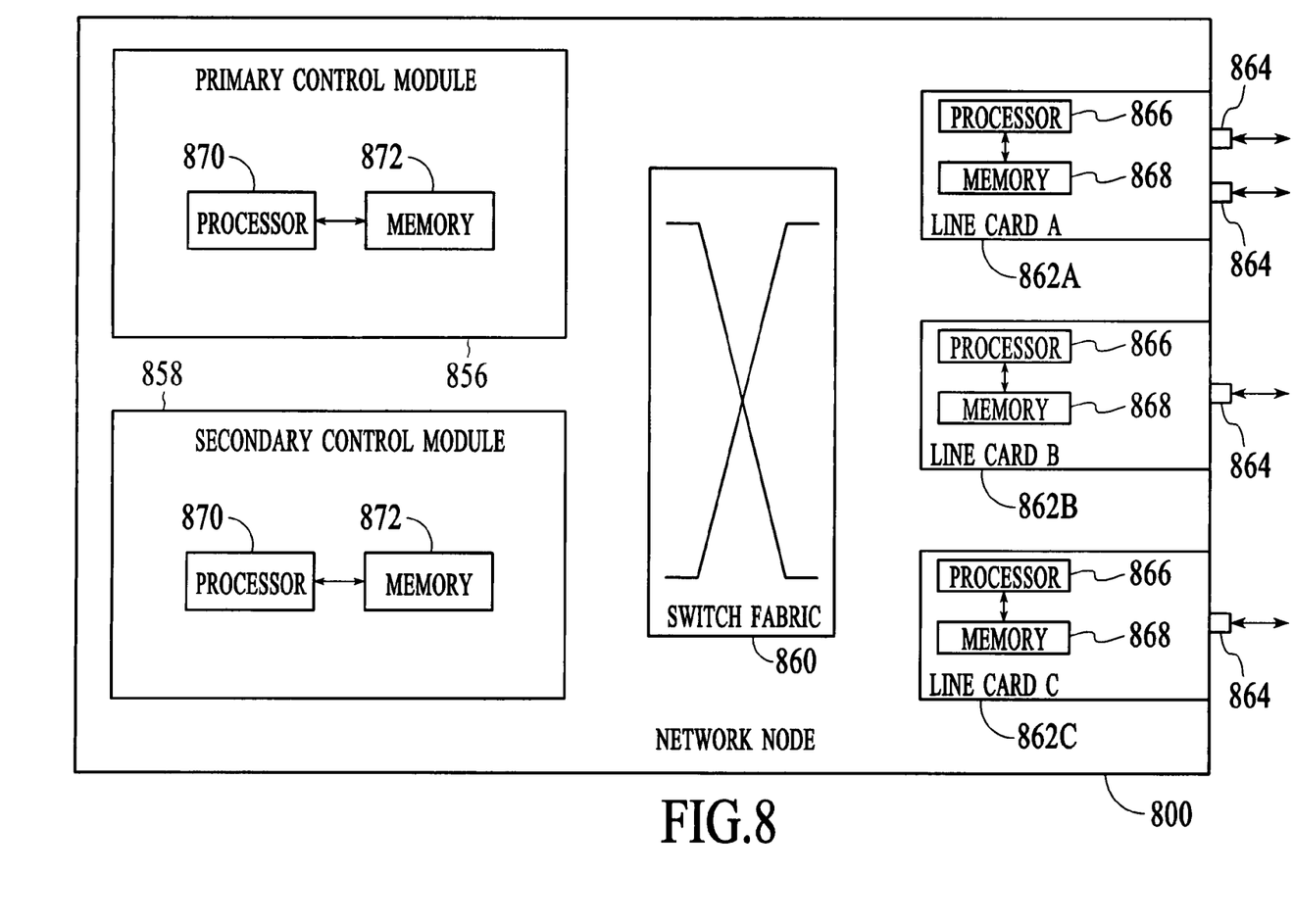
FIG. 8 depicts an embodiment of a network node in which an embodiment of the invention can be implemented.

FIG. 8 depicts an embodiment of a network node 800 in which an embodiment of the invention can be implemented. The example network node, which can be implemented as a carrier edge device, includes a primary control module 856, a secondary control module 858, a switch fabric 860, and three line cards 862A, 862B, and 862C (line cards A, B, and C). The network node handles traffic in discrete units, often referred to as datagrams. In an embodiment, the network node is an Ethernet switch/router that forwards traffic within the network node using Layer 2, Layer 3, and/or Layer 4 header information. The network node may include line cards that support network protocols such as Ethernet, ATM, and Frame Relay. Although an Ethernet-based switch/router is described, the disclosed loop management techniques can be applied to other types of network nodes.

Each of the line cards includes at least one port 864, a processor 866, and memory 868, which perform functions such as receiving traffic into the network node, buffering traffic, making forwarding decisions, and transmitting traffic from the network node. The processor within each line card may include a multifunction processor and/or an application specific processor that is operationally connected to the memory. The processor performs functions such as packet parsing, packet classification, and making forwarding decisions. The memory within each line card may include circuits for storing operational code, for buffering traffic, for storing logical port information, and for storing other data structures. Operational code is typically stored in non-volatile memory such as electrically erasable programmable read-only memory (EEPROM) or flash ROM while traffic and data structures are typically stored in volatile memory such as random access memory (RAM). Example data structures that are stored in the RAM include traffic forwarding information (i.e., exit port tables). Forwarding information may also be stored in content addressable memory (CAM) or a combination of CAM and RAM. Although the processor and memory are depicted as separate functional units, in some instances, the processor and memory are integrated onto the same device. In addition, there may be more than one discrete processor unit and more than one memory unit on the line cards.

The switch fabric 860 provides datapaths between input ports and output ports and may include, for example, shared memory, shared bus, and crosspoint matrices. Although not depicted, the network node 800 may be equipped with redundant switch fabrics.

The primary and secondary control modules 856 and 858 support various functions, such as network management functions and protocol implementation functions. Example network management functions that are performed by the control modules include implementing configuration commands, providing timing control, programming hardware tables, providing system information, supporting a user interface, managing hardware changes, bus management, managing logical ports, managing VLANs, and protocol processing. Example protocols that are implemented by the control modules include Layer 2 (L2) protocols, such as L2 Learning, STP, and LACP and Layer 3 (L3) protocols such as OSPF, BGP, and ISIS. The layers are defined by the ISO in the OSI model.

Each of the control modules 856 and 858 includes a processor 870 and memory 872 for carrying out the designated functions. The processor within each control module may include a multifunction microprocessor and/or an application specific processor that is operationally connected to the memory. The memory may include EEPROM or flash ROM for storing operational code and DRAM for buffering traffic and storing data structures, such as port information and VLAN tables. Although the processor and memory are depicted as separate functional units, in some instances, the processor and memory are integrated onto the same device. In addition, there may be more than one discrete processor unit and more than one memory unit on the control modules.

Figure 9:
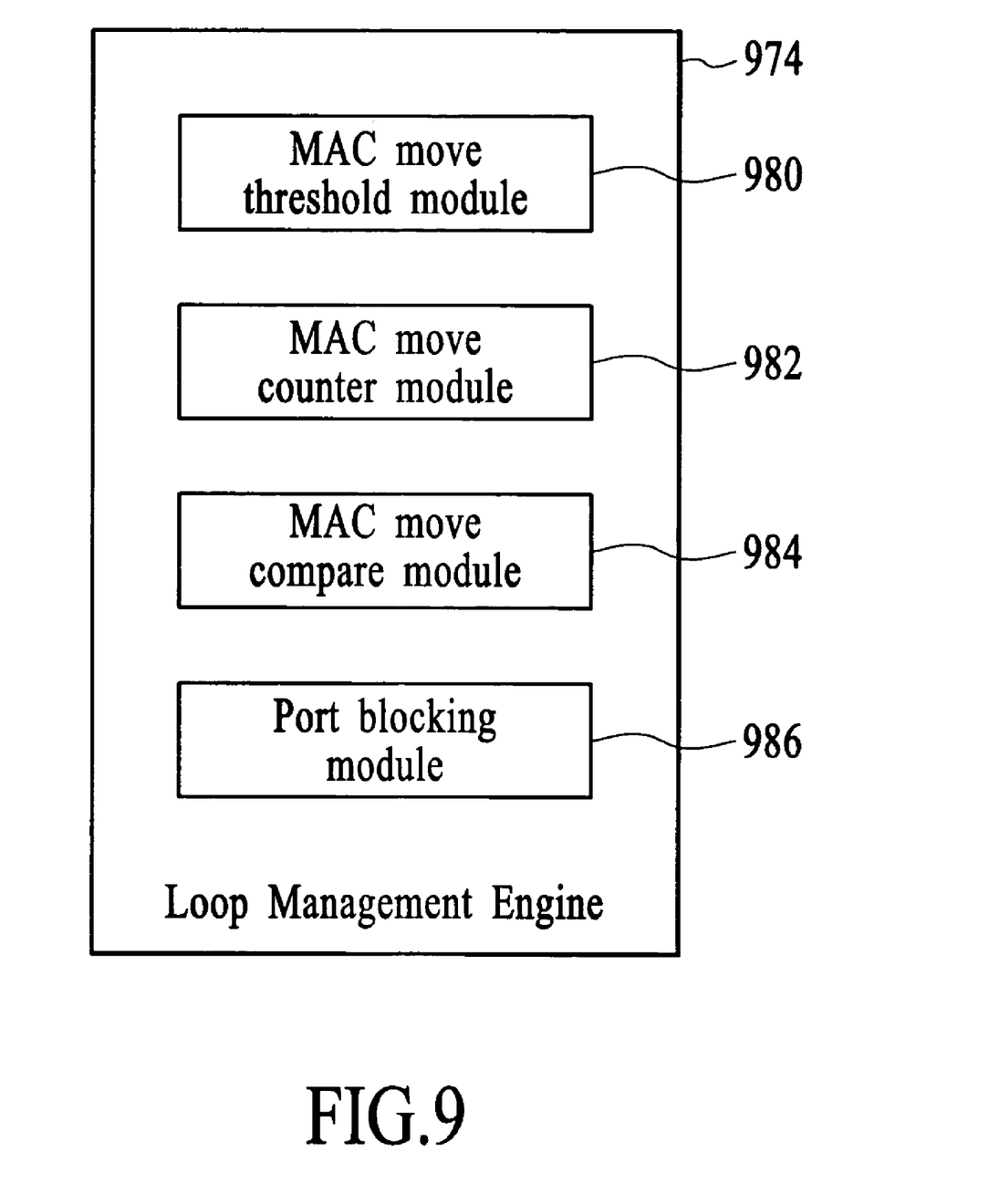
FIG. 9 is a functional depiction of a loop management engine in accordance with the invention.

In an embodiment, the loop management functionality that is described above with reference to FIGS. 1-7 is implemented with the support of loop management engines that exist at the control modules and the line cards. FIG. 9 illustrates a functional depiction of a loop management engine 974 that exists at a control module and line cards of a network node. The loop management engine may be embodied in a combination of software and hardware. Functional elements of the loop management engine include a MAC move threshold module 980, a MAC move counter module 982, a MAC move compare module 984, and a port blocking module 986. These modules perform the corresponding functions that are described above with reference to FIGS. 1-7.

Although specific embodiments of the invention have been described and illustrated, the invention is not to be limited to the specific forms or arrangements of parts as described and illustrated herein. The invention is limited only by the claims.

What is claimed is:

1. A method for managing loops between network devices comprising:
   establishing a media access control (MAC) move threshold;
   monitoring MAC moves between ports;
   comparing the MAC moves to the MAC move threshold; and
   initiating a loop protection action if the MAC moves exceed the MAC move threshold.

2. The method of claim 1 wherein establishing the MAC move threshold includes identifying a number of MAC moves.

3. The method of claim 1 wherein establishing the MAC move threshold includes identifying a number of MAC moves per unit of time.

4. The method of claim 3 wherein establishing the MAC move threshold includes purposefully creating a loop between network devices and counting the number of MAC moves per unit of time that are caused from the loop.

5. The method of claim 1 wherein initiating a loop protection action includes blocking flows related to the MAC moves that have exceeded the MAC move threshold.

6. The method of claim 5 further including identifying ports that can be blocked if the MAC move threshold is exceeded.

7. The method of claim 5 further including identifying virtual local area networks (VLANs) that can be blocked if the MAC move threshold is exceeded.

8. The method of claim 7 wherein identifying VLANs that can be blocked includes identifying one of a specific VLAN, a VLAN range, all VLANs, and all VLANs except specified VLANs.

9. The method of claim 5 further including releasing the blocked flows upon the expiration of a pre-established time period.

10. The method of claim 1 wherein initiating a loop protection action includes blocking only flows related to the MAC moves that have exceeded the MAC move threshold.

11. The method of claim 5 further including identifying blockable ports.

12. The method of claim 11 further including identifying blockable VLANs.

13. A method for managing loops between a customer network and a carrier network comprising:
   establishing a media access control (MAC) move threshold;
   monitoring the rate of MAC moves between ports of a carrier device that are caused by customer traffic from a customer network, the carrier device being in a carrier network that receives traffic from the customer network;
   comparing the rate of MAC moves at the carrier device to the MAC move threshold; and
   initiating a loop protection action at the carrier device if the rate of MAC moves exceeds the MAC move threshold.

14. The method of claim 13 wherein establishing the MAC move threshold includes identifying a number of MAC moves per unit of time.

15. The method of claim 14 wherein establishing the MAC move threshold includes purposefully creating a loop between customer and carrier networks and counting the number of MAC moves per unit of time that are caused from the loop.

16. The method of claim 13 wherein initiating a loop protection action includes blocking flows related to the MAC moves that have exceeded the MAC move threshold, the flows being blocked at the carrier device.

17. The method of claim 16 further including identifying ports that can be blocked if the MAC move threshold is exceeded.

18. The method of claim 16 further including identifying VLANs that can be blocked if the MAC move threshold is exceeded.

19. The method of claim 18 wherein identifying VLANs that can be blocked includes identifying one of a specific VLAN, a VLAN range, all VLANs, and all VLANs except specified VLANs.

20. The method of claim 16 further including releasing the blocked flows upon the expiration of a pre-established time period.

21. The method of claim 13 wherein initiating a loop protection action includes blocking only flows related to the MAC moves that have exceeded the MAC move threshold.

22. The method of claim 16 further including identifying blockable ports.

23. The method of claim 22 further including identifying blockable VLANs.

24. A system for managing loops between a customer network and a carrier network comprising:
   means for establishing a media access control (MAC) move threshold;
   means for monitoring the rate of MAC moves between ports of a carrier device that are caused by customer traffic from a customer network, the carrier device being in a carrier network that receives traffic from the customer network;
   means for comparing the rate of MAC moves at the carrier device to the MAC move threshold; and
   means for initiating a loop protection action at the carrier device if the rate of MAC moves exceeds the MAC move threshold.

25. The system of claim 24 wherein the means for establishing the MAC move threshold includes means for identifying a number of MAC moves per unit of time.

26. The system of claim 24 wherein the means for initiating a loop protection action includes means for blocking flows related to the MAC moves that have exceeded the MAC move threshold, the flows being blocked at the carrier device.

27. The system of claim 26 further including means for releasing the blocked flows upon the expiration of a pre-established time period.

28. A system for managing loops between a customer network and a carrier network comprising:
   a loop management engine configured to establish a media access control (MAC) move threshold, to monitor the rate of MAC moves between ports of a carrier device that are caused by customer traffic from a customer network, the carrier device being in a carrier network that receives traffic from the customer network, to compare the rate of MAC moves at the carrier device to the MAC move threshold, and to initiate a loop protection action at the carrier device if the rate of MAC moves exceeds the MAC move threshold.

29. The system of claim 28 wherein the loop management system is further configured to establish the MAC move threshold includes means for identifying a number of MAC moves per unit of time.

30. The system of claim 28 wherein the loop management system is further configured to block flows related to the MAC moves that have exceeded the MAC move threshold, the flows being blocked at the carrier device.

31. The system of claim 30 wherein the loop management system is further configured to release the blocked flows upon the expiration of a pre-established time period.

* * * * *